US009352293B2

(12) United States Patent
Llamas et al.

(10) Patent No.: US 9,352,293 B2
(45) Date of Patent: May 31, 2016

(54) REGENERATOR FOR CATALYTIC CRACKING UNIT WITH EXTERNAL CYCLONES (75) Inventors: Juan-David Llamas, Le Havre (FR); Guillaume Berric, Fontaine-la-Mallet (FR)

(73) Assignee: TOTAL RAFFINAGE FRANCE, Courbevoie (FR)

( * ) Notice: Subject to any disclaimer, the term of this patent is extended or adjusted under 35 U.S.C. 154(b) by 0 days.

(21) Appl. No.: 14/232,494

(22) PCT Filed: Aug. 14, 2012

(86) PCT No.: PCT/FR2012/051899
§ 371 (c)(1),
(2), (4) Date: Feb. 14, 2014

(87) PCT Pub. No.: WO2013/030490
PCT Pub. Date: Mar. 7, 2013

(65) Prior Publication Data
US 2014/0150654 A1 Jun. 5, 2014

(30) Foreign Application Priority Data

Aug. 31, 2011 (FR) ...................................... 11 57665

(51) Int. Cl.
B01D 45/12 (2006.01)
B01J 8/18 (2006.01)
B01D 45/16 (2006.01)
B01J 8/34 (2006.01)
B01D 45/08 (2006.01)
B01J 19/32 (2006.01)
(Continued)

(52) U.S. Cl.
CPC ............... *B01J 8/1872* (2013.01); *B01D 45/08* (2013.01); *B01D 45/12* (2013.01); *B01D 45/16* (2013.01); *B01J 8/0055* (2013.01); *B01J 8/0065* (2013.01);
(Continued)

(58) Field of Classification Search
CPC .......... B01J 8/1872; B01J 8/0065; B01J 8/34; B01J 8/0055; B01J 19/32; C10G 11/18; B01D 45/12; B01D 45/08; B01D 45/16; B01D 50/002; F01M 13/04
USPC ............. 55/440–446, 416, DIG. 37, DIG. 23, 55/462, 464–465; 95/272, 271; 96/358, 96/360, 188–190; 422/144; 208/247, 208/208 R
See application file for complete search history.

(56) References Cited

U.S. PATENT DOCUMENTS 2,728,632 A    12/1955  Matheson
3,851,405 A    12/1974  Furukawa et al.
(Continued)

FOREIGN PATENT DOCUMENTS

WO    00/35575 A1    6/2000

OTHER PUBLICATIONS

International Search Report of PCT/FR2012/051899 dated Nov. 6, 2012.

Primary Examiner — Dung H Bui
(74) Attorney, Agent, or Firm — Sughrue Mion, PLLC (57) ABSTRACT Regenerator for catalytic cracking unit comprising a first part occupied by a dense fluidized bed of catalyst and a second part positioned above the first part and occupied by a fluidized bed of low solid particles density, the said second part comprising one internal device covering, by projection onto the plane of the cross section of the said vessel of the regenerator, at least 80% of the said cross section, the said regenerator being equipped with at least one cyclone for separating gases/solids in the mixture derived from the low-density bed, the said cyclone being placed outside the vessel of the regenerator.

13 Claims, 3 Drawing Sheets (51) Int. Cl.
 *B01J 8/00* (2006.01)
 *C10G 11/18* (2006.01)
 *B01D 50/00* (2006.01)
 *F01M 13/04* (2006.01)
(52) U.S. Cl.
 CPC .. *B01J 8/34* (2013.01); *B01J 19/32* (2013.01); *C10G 11/18* (2013.01); *B01D 50/002* (2013.01); *F01M 13/04* (2013.01)

(56) References Cited

U.S. PATENT DOCUMENTS 4,589,352 A 5/1986 Van Gasselt et al.
6,224,833 B1 * 5/2001 Rall .............................. 422/143
2004/0226862 A1 * 11/2004 Meier et al. ............... 208/208 R

* cited by examiner

REGENERATOR FOR CATALYTIC CRACKING UNIT WITH EXTERNAL CYCLONES

CROSS REFERENCE TO RELATED APPLICATIONS

This is a National Stage of International Application No. PCT/FR2012/051899 filed Aug. 14, 2012, claiming priority based on French patent application No. 11 57665 filed Aug. 31, 2011, the contents of all of which are incorporated herein by reference in their entirety.

The present invention relates to a small-sized fluidized-bed regenerator with external cyclones for a fluid catalytic cracking (FCC) unit, to its operation in a catalytic cracking method and to its use as a regenerator for new units or alternatively as a replacement for large-sized regenerators.

The objective here is to transform the design of the regenerators used in catalytic cracking units, containing a fluidized bed, for which it used to be necessary to manufacture regenerators that were long enough to encourage the solid particles transported by the gases to disengage and fairly wide in the region of the dilute phase of the fluidized bed in the regenerator so that they could accommodate the cyclones that allow separation between gas and solid particles while at the same time limiting the increase in the surface velocity of the gases.

What happens is that when solid particles are fluidized by a gas, the concentration of particles which are carried out of the vessel is dependent on the height of that vessel and on the surface velocity of the fluidizing gas. For a given gas velocity, the particles concentration in the gas decreases with the height above the level of the dense fluidized bed until it reaches a limiting minimum value. The minimum height needed to reach this limiting concentration is the transport disengaging height more commonly known to those skilled in the art by its English acronym TDH.

For many years now, industry has been preoccupied with optimizing the separation of the gases recovered from a gas/solid fluidized mixture, and many patents have been filed for various cyclone or separator structures intended to be placed within the relatively un-dense fluidized phase of the regenerator. There are usually two cyclone stages in series, each stage being made up of several cyclones in parallel. The cyclones of the first stage are known as the primary cyclones and those of the second stage are known as the secondary cyclones. However, these cyclones rapidly become worn when the quantity and/or the velocity of the solid particles transported by the gases is high, said particles having an abrasive effect on the internal wall of the said cyclones.

Hence, when there is a great deal of particle transportation, cyclone erosion, particularly in respect of the secondary cyclones, is one of the main causes for the unwanted shutdown of catalytic cracking units.

At the present time, the solutions employed to limit this phenomenon usually involve increasing the size of the regenerators. This is because FCC regenerators are often sized so that, at a given gas velocity, the height above the dense bed is at least equal to the TDH. This makes it possible to minimize the amount of solid that has to be separated from the gas by the cyclones. Through this means, a reduction in solid catalyst loss is obtained, and the cyclone life is lengthened. In certain other configurations, the diameter of the regenerator, above the level of the fluidized bed, may also be increased, again with a view to compensating for the surface area occupied by the cyclones and to preventing any increase in the gas velocity that is likely to increase the amount of particles transported as far as the cyclones. These two solutions do nonetheless have a limited effect and result in high manufacturing costs.

In order to remedy these problems of limited effectiveness, the not-insignificant costs of replacing the cyclones and the costs associated with building a large-sized regenerator, the applicant has chosen to use effective internals or devices for separating the gases from the transported solid particles to make it possible to limit the increase in velocity of the gases while at the same time very much slowing down the solid particles, these devices or internals preferably being situated in the dilute phase of the regenerator.

Various configurations for reducing the transport of solids in the field of FCC regenerators have been proposed.

U.S. Pat. No. 6,503,460 describes a countercurrent FCC regenerator equipped with internal elements in the dense phase of the fluidized bed. Whereas the prime objective of the internal elements is to improve contact between the phases, a reduction in the transportation of solid particles has also been observed. This reduction is attributed to the reduction in the diameter of the ascending gas bubbles passing through the internal elements in the dense phase, just before they burst at the surface of the dense catalytic bed.

U.S. Pat. No. 7,829,750 discloses an FCC regenerator in which the diameter of the dilute phase of the fluidized bed has been increased in order to limit the surface velocity of the gas. In this case, an internal element is placed at the base of the widening. According to that patent, the simultaneous use of these two solutions allows the transportation of solid particles to be limited. This solution is particularly applied to catalytic beds that have a sub-40-micron particle concentration of below 2%.

In U.S. Pat. No. 3,851,405, bars or tubes are arranged at fixed intervals, the purpose of these bars or tubes being to slow the velocity of the particles flying above the fluidized mixture. The spacing between each internal element and its closest neighbour falls within the range from 0.05 to 0.3 times the height of the fluidized bed, and the ratio of the projected area of all of the internal elements to the cross-sectional area of the reactor is no higher than 0.5. The Applicant has found out that bars or tubes result in an increase of the gas velocity, which is not desirable. Moreover, in this document, the pipe for returning the solid particles, which connects the cyclone to the reactor, opens above the internal element, such that the solids returned to the reactor may possibly be again transported by the gas, which is not desirable.

In patent EP49130, the device that reduces the number of particles transported by the gas is an internal element placed in a free region of the reactor of which the ratio of the projected surface area to the cross section of the reactor is no less than 0.8 and of which the ratio of the opening to the unoccupied cross-sectional area of the reactor varies from 0.3 to 0.9. Such an internal element is obtained by combining discs and rings, rotation bodies and/or an assembly of inclined strips in order to provide a downward removal of the particles.

In U.S. Pat. No. 2,728,632, the internal element arranged in the reactor consists of a layer of mutually parallel plates of a width such that the ratio of their width to the diameter of the reactor in which they are installed is 4:1. Here, the desired objective is to cause the gases to rise diagonally in the reactor and to force the transported solids to encounter the plates, contact slowing the velocity of the solids which ultimately drop back down along each of the plates.

Such devices of the prior art have made it possible to limit the transportation of solids but not while at the same time allowing the size of the regenerators to be reduced. The demands associated with manufacturing large-sized units, in terms of costs and engineering, have therefore remained unchanged. At the same time, if the reduction in solid transportation is not sufficiently great, such devices require the use of two stages of cyclones. The reliability problems associated with the use of secondary cyclones cannot therefore be completely excluded. This lack of reliability of the secondary cyclones encourages unit shut-downs which are expensive in terms of repair costs and especially in terms of production down-time.

The applicant has therefore recommended a method for separating the particles from the gas derived from a fluidized bed which involves covering the largest possible surface area of the cross section of the reactor with one internal device with a view to knocking as many particles as possible back down towards the bed while at the same time limiting the free area occupied by this internal device at all levels perpendicular to the axis of the said reactor in order to obtain the greatest possible free area and reduce as much as possible the increase in the velocity of the gas.

The subject of the present invention is therefore a regenerator for catalytic cracking unit formed of a vessel comprising a first part intended to be occupied by a dense fluidized bed of solid particles and a second part positioned above the first part and intended to be occupied at least partly by a fluidized bed of dilute or low solid particles density, the said second part comprising one internal device covering, by projection onto the plane of the cross section of the said vessel, at least 80% of the free area of the vessel, the vessel being equipped with at least one cyclone for separating a mixture of gases and solid particles derived from the low-density bed, the cyclone being placed outside the vessel, said cyclone being designed to collect said mixture of gas and solid particles and comprising one pipe opening inside the vessel, under said internal device, without passing through said internal device.

In the context of the present description, solid particles mean any type of materials used in fluidized mixtures, but will advantageously mean solid particles of catalysts as those conventionally found in FCC units.

Likewise, the cross section of the vessel means the plane perpendicular to the axis of the said vessel and therefore perpendicular to the direction in which the mixture of gas and solid particles flows. The free area of the vessel is the free cross-sectional area left unoccupied in the plane of the cross section of the said vessel, excluding equipment situated inside the vessel (cyclones, tubular pipes, internal, or other usual device).

The key advantage of the invention is that it has the internal device acts as a primary separator, performing the function currently performed by one or more cyclone(s), often of large size, contained within the regenerator. The greater the quantity of solid particles held back by the internal device in the vessel of the regenerator, the less necessary it becomes for the last few particles to be separated out in cyclones inside the vessel.

Another advantage is that it is possible to install an internal device which covers all of the cross section of the regenerator without worrying about leaving space for internal cyclones, and this constitutes a sure economic saving associated with the reduction in height and therefore volume, of the regenerator. Specifically, the height criterion defined by the TDH would no longer need to be observed because the solids concentration after the internal device is appreciably lower than could have been achieved, without internal device, by adhering to the TDH criterion.

By using suitably chosen internal device positioned so that it cover all of the surface area of the fluidized bed in its least dense part, the transportation of solid particles can be reduced significantly just after the internal device. As a result, the height of the dilute phase can be greatly reduced as too in consequence may that of the vessel of the regenerator which will then contain little more than the dense phase of the bed, the need for cyclone separators positioned inside the vessel of the regenerator becoming near-zero. Thus, one single stage of cyclones positioned outside the vessel of the regenerator may make it possible to reduce solid particle losses to the levels generally expected at the outlet from the regenerator. This is particularly advantageous as it is known that for a FCC unit producing 7500 tons of effluent per day, as far as 800kg/day of catalyst may be lost at the regenerator and 200 kg/day of catalyst may be lost at the FCC reactor.

Because the gas leaving the vessel of the regenerator equipped with one internal device is not very laden with solid particles, the cyclone (or cyclones) positioned at the outlet is (are) less subject to the problems of erosion commonly encountered in catalytic cracking units. The invention therefore relates to an FCC regenerator which would not only be smaller but also more reliable than conventional bubbling fluidized bed regenerators.

Another advantage of the invention is that by moving the cyclones out of the vessel of the regenerator and by reducing the amount of particles sent to these cyclones, the unit becomes less sensitive in terms of reliability, to the increase in the flow rate of air introduced to burn off the coke present on the catalyst, as concerns a FCC. Thus, it becomes possible more easily to increase the capacity and therefore throughput of the FCC units.

Moreover, the fact that the pipes connecting the external cyclones to the vessel do not pass through the internal device makes it possible to reduce the risks of preferential passage of gas through the internal device, along this pipe. Such preferential passages of gas through the internal device along the pipe or pipes are liable to encourage the erosion of the internal device and/or the pipe, and this is undesirable.

Further, having these pipes pass through the internal device would reduce the available surface area of the internal device, and this would result in an increase in the velocity of the gases, something which is undesirable in terms of solid-separation efficiency.

In a preferred embodiment of the invention, the regenerator comprises one, two or three stages of cyclones in series, each stage being made of a number of cyclones that varies from 1 to 10.

In particular, the cyclone or cyclones of a single cyclone(s) stage or of the first cyclone(s) stage is or are designed in such a way as to collect the gas mixture directly at the outlet of the vessel, for example using one or more pipe(s) connected to a vessel outlet pipe also known as a chimney.

The cyclone or cyclones of the second or third cyclone(s) stage may be designed to collect the gas mixture directly at the outlet of the cyclone or cyclones of the preceding stage, for example by means of one or more pipes connected to an outlet pipe of the cyclone or cyclones of the preceding stage.

The regenerator is preferably equipped with two cyclone stages in series, a primary cyclones stage the cyclone(s) of which is (are) designed to collect the gases derived from the vessel of the regenerator, and a secondary cyclones stage the cyclone(s) of which is (are) designed to collect the gases derived from the primary cyclones stage, and the pipe(s) which returns (return) the solid particles from the primary cyclone(s) to the vessel opens (open) into the first part of the vessel under the internal device and without passing through it, and the pipe(s) which returns (return) the solid particles from the secondary cyclone(s) to the vessel opens (open) into the second part of the vessel, under the internal device and without passing through it.

Because the internal device covers a large proportion of the cross section of the vessel of the regenerator, it will advantageously be positioned above the dense bed at a height h from the surface of the dense fluidized bed such that the ratio of this height to the height of the dense fluidized bed $H_1$ varies from 0.05 to 1.5. This height, also known hereinafter as thickness, is measured parallel to the longitudinal axis of the vessel, which is generally vertical.

The low density or dilute fluidized bed may be characterized by its void fraction. The latter is defined as being the ratio of the volume of gas to the total volume of fluidized mixture. A dense phase of the fluidized mixture will therefore be defined as the phase in which the void fraction is lower than 0.7, i.e. when the volume of gas is less than 70% of the volume of the fluidized mixture. The low density or dilute phase will be defined as the phase in which the void fraction is higher than 0.7, i.e. when the volume of the gas is more than 70% of the volume of the fluidized mixture.

For calculating the void fraction of a fluidized mixture it is possible only to approximate the density of the constituents of the said fluidized mixture. It is known that the void fraction, or its corollary the density of a fluidized mixture, is not uniform over its entire height and/or width in a vessel and, in particular, that it varies very greatly between the lower and the upper part thereof. The void fraction can be calculated from the density of the gas present in the fluidized mixture (Dg), from the density of the solids used (Ds) and from the density of the fluidized mixture (Dm).

This void fraction is calculated using the following equation (I):

$$\text{Void faction} = (Ds - Dm)/(Ds - Dg) \quad (I)$$

The densities of the solid and of the gas mixture contained in the fluidized mixture can be measured and/or calculated by techniques known per se by those skilled in the art.

The density of the fluidized mixture is obtained, for example, by measuring the pressure drop using pressure sensors positioned at two levels in the said mixture considering that a fluidized mixture behaves like a liquid (refer to the description on page 5 of the work entitled "Fluidization Engineering" by Daizo Kunii and Octave Levenspiel—2nd edition, 1991). Because, according to equation (II) below:

$$\Delta P = Dm * g * H \quad (II)$$

the pressure drop measured between these two points in the fluidized mixture is equal to the product of the density, Dm, of the fluidized mixture, the acceleration g due to gravity and the distance H between these two points, it is easy to recalculate Dm.

For a fluidized mixture containing a solid, the apparent density of which is of the order of 1350 kg/m$^3$, in a gaseous mixture containing over 70% nitrogen at a pressure of around 2 bar and at a temperature of the order of 750° C., the void fraction is higher than 0.7 and the density is lower than 400 kg/m$^3$.

To optimize the size of the regenerator and, therefore, the number of cyclones at the gas outlet, the structure of the internal device will be chosen so that the latter occupy less than 10% of the free area parallel to the cross section of the said vessel of the regenerator and so that their projection onto the plane of the said cross section covers more than 80% of the surface area of the said free area, and preferably more than 90% thereof.

Within the context of the present invention, when the internal device occupies less than 10% of the free area of the vessel of the regenerator, that means that the surface area occupied by the cross section of the said internal device parallel to or superposable with the free area of the vessel of the regenerator corresponds to less than 10% of the surface area of the said free area.

For preference, the cross section of the internal device parallel to the plane of the cross section of the vessel of the regenerator will not occupy any more than 5% at most of the surface area of the said free area left uncovered within the vessel of the regenerator.

The internal device is advantageously made up of one or more individual elements, each individual element being made up of one or more stages of plates which are inclined. According to an alternative embodiment, the plates of two adjacent stages are separate.

Thus, no preferential circulation passage forms along the axis of the vessel of the regenerator when the gas passes through the successive stages of plates of the internal device, contrary to the case with other known systems, like the one described in document U.S. Pat. No. 4,589,352. Furthermore, in a system like that of document U.S. Pat. No. 4,589,352, there are volumes in which solids can accumulate under the internals, and this is not desirable. Internal device according to the invention advantageously have a height of 30 to 50 cm and the inclination of each plate with respect to a horizontal plane is between 30 and 60° inclusive.

The inclination of each plate of the internals in the vessel, with respect to a horizontal plane, may be between 35 and 55° inclusive. As a particular preference, the inclination of each plate with respect to a horizontal plane is between 40 and 50° inclusive. In addition, it has been found that a value of 45° gives excellent results in terms of solid particle separation.

Any internal device that comply with the abovementioned characteristics may be suitable for implementing the present invention.

In one preferred embodiment, the internal device chosen will be made up of one or more individual elements, each element being made up of one or more stages of plates which are inclined, parallel to one another within one and the same stage and of which the directions of inclination vary from one stage to the other, or else made up of one or more individual elements, each element being made up of one or more stages of plates which are inclined, the inclined plates of each stage being criss-crossed.

For preference, of the various internal devices available on the market, the present invention may make use of the internal device described in patent application WO 00/35575. In this document, the internals are used to improve contact between a gas and solids flowing countercurrentwise. Contrary to every expectation, the applicant found that this type of internals was perfectly suited to separating solids carried along by a gas in co-current flow, as in the present invention.

Alternatively, the present invention uses the internal device described in application WO2012/022910, incorporated by reference.

For practical purpose, for large cross sections of vessel of regenerator, the internal device will comprise several individual internals inside the vessel of the regenerator. In order to create the internal device on an industrial scale, the internal device would be formed to cover all or part of the free area of the vessel by juxtaposing individual internals so as to achieve the internal device characteristics according to the invention.

It would not constitute a departure from the scope of the invention if, in order to improve the separation of gases and solids, notably in a fluidized bed catalytic cracking regenerator, one second internal device were to be added within the dense fluidized bed of the vessel of the regenerator, in order to slow the transportation of particles, notably coke, and therefore ensure better combustion thereof within the bed.

Furthermore, the invention as described can also be applied to all the stages of a multi-stage regenerator, particularly for building new regenerators or for renovating old units.

The invention also relates to a method of separating a mixture of gas and solid particles derived from a regenerator of a catalytic cracking unit, the said regenerator comprising a vessel of which a first part is occupied by a dense fluidized bed of catalyst particles and a second part, arranged above the first part, is occupied by a fluidized bed of low catalyst-particle density with respect to the dense bed, in which the gases and solids from the low-density bed pass through an internal device situated inside the vessel of the regenerator and are then collected at the outlet of the vessel by at least one separation cyclone situated outside the said vessel, in which the solid particles recovered by the external cyclone(s) are returned into the vessel, under the internal device, without passing through the latter, and in which the said internal device cover, by projection onto the plane of the cross section of the vessel of the regenerator, at least 80% of the free area of the vessel of the regenerator, the said internal device being made up of one or more individual elements, each individual element being made up of one or more stages of plates which are inclined, each stage being made up of plates that criss-cross one another.

In particular, the use of internal device according to the invention, situated inside the vessel of the regenerator, makes it possible to reduce of more than 70% the quantity of solid particles that the cyclone or cyclones have to treat, thus making it possible to reduce the number of cyclones or to use cyclones which are smaller in size.

The internal device used may have one or more of the features described above or with reference to the examples.

The present invention is now described in the light of the figures and examples given hereinafter.

Figure 1:
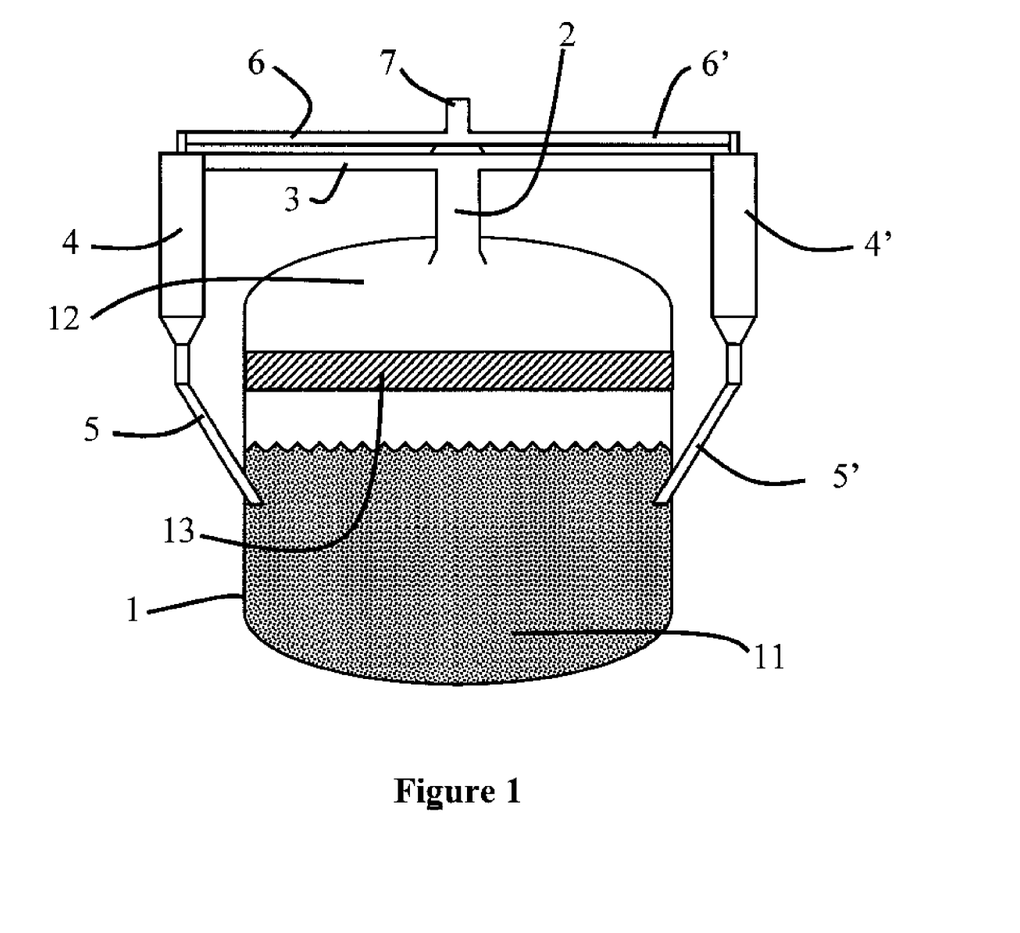
FIG. 1 shows a small-sized regenerator, equipped with an internal device placed in the most dilute part of the fluidized bed.

FIG. 1 depicts a regenerator according to the invention which comprises a vessel (1) in which there is a fluidized bed of solid particles comprising a dense fluidized bed (11) and a dilute (or low density) fluidized bed (12), the latter comprising the internal device (13) positioned immediately above the bed.

The regenerator according to the invention comprises, in its upper part, a chimney (2) for recovering the gases, the last being potentially still laden with fine solid particles, said chimney (2) redirecting these gases via a pipe (3) to two cyclones (4) and (4'). In a know manner, the function of such cyclones (4) and (4') is to collect the mixture of gas and solid particles, immediately at the outlet of the vessel (1), and to separate the solid particles. The gas is removed from these cyclones (4) and (4') via the discharges (6) and (6'), then via a pipe (7). Any solids recovered in the cyclones are returned to the dense bed (11) of the regenerator by pipes (5) and (5'). These pipes (5, 5') open inside the vessel (1), under the internal device (13).

The vessel (1) also comprises a gas distributor at its bottom, not shown in FIG. 1.

FIG. 1 thus depicts one example of a regenerator equipped with a single stage of two cyclones. Similarly, the vessel of the regenerator may be equipped with a greater number of cyclones, for example from 3 to 10 cyclones connected similarly to the vessel in order to collect the mixture of gas and solid particles derived from the low-density bed. As an alternative, just one of the two cyclones may be provided.

Figure 2:
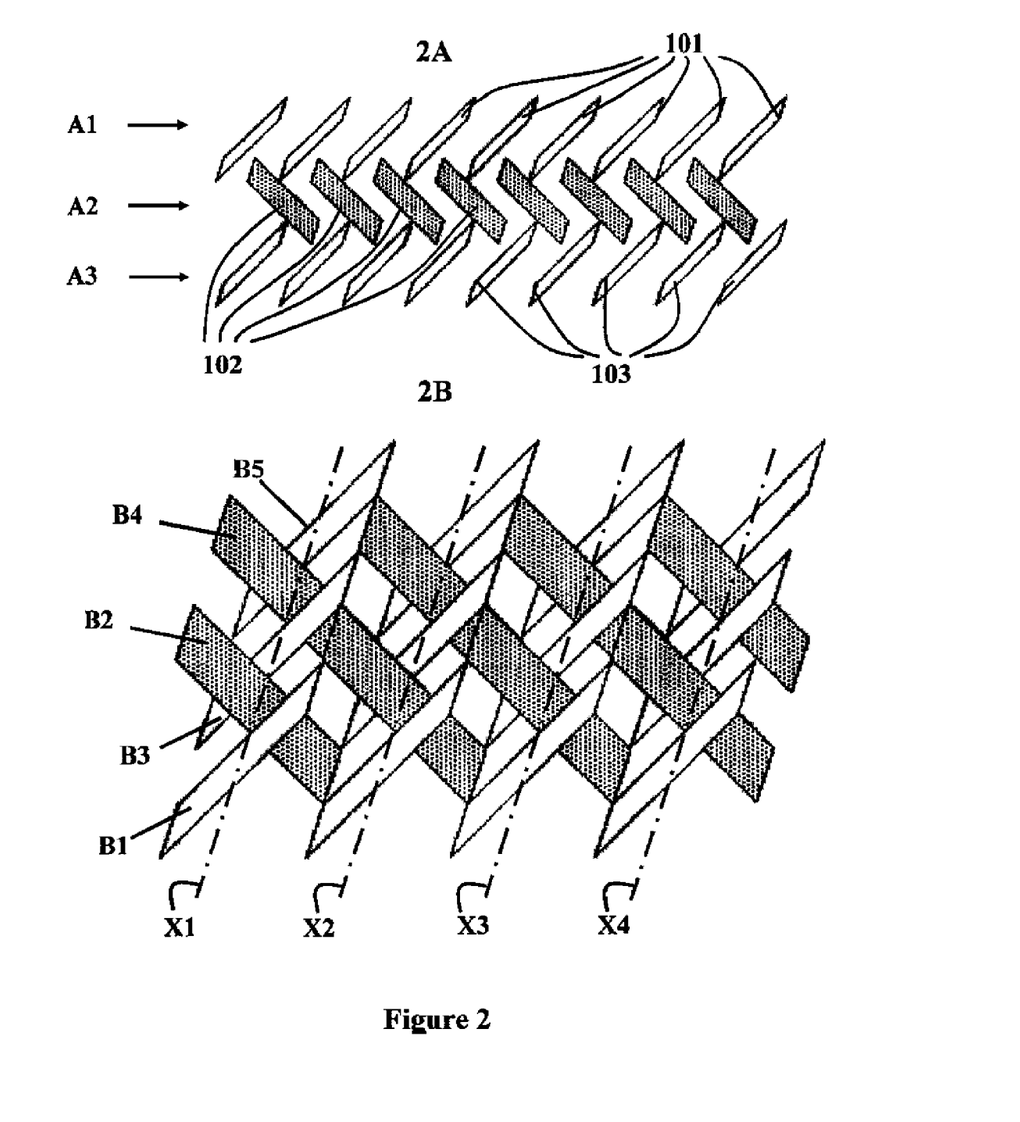
FIG. 2 presents two types of internal devices 2A and 2B that can be used and are effective in a miniaturized regenerator.

In FIG. 2, the internal device 2A corresponds to a superposition of layers of fins 101, 102, 103 (or deflectors) which are equidistant and mutually parallel within one and the same layer. The fins 101, 102, 103 of one and the same layer are thus inclined by the same angle with respect to the plane of section of the internal device (perpendicular to the axis of the vessel). The inclinations of the fins of two adjacent layers are the opposite of one another with respect to this plane of section of the internal device. For the sake of clarity, each layer A1, A2, A3 of the internal device 2A of FIG. 2 comprises fins 101, 102, 103, respectively, that are all mutually parallel. Of course, an internal device 2A may comprise a variable number of fins 101, 102, 103. This internal device is of the type disclosed in document WO 2012-022910.

The internal device 2B comprises a multitude of deflectors corresponding to a criss-crossing of plates about various axes X1, X2, X3 and X4, arranged parallel to one another, two plates that are adjacent along one and the same axis Xi (B1, B2), (B2, B3), (B3, B4), (B4, B5) having opposite inclinations with respect to the cross section of the internal device, perpendicular to the axis of the vessel. This internal device is of the kind described in document WO 00/35575.

Figure 3:
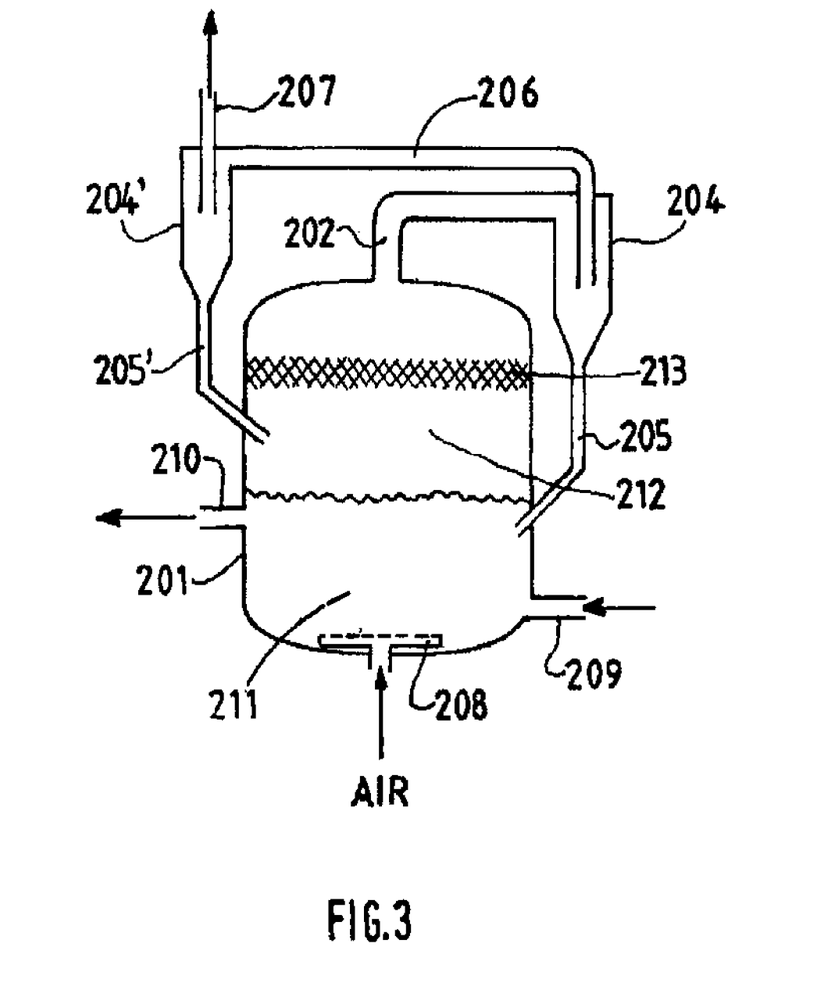
FIG. 3 depicts a regenerator equipped with an internal device and two stages of cyclones.

FIG. 3 depicts a regenerator equipped with an internal device and with two stages of cyclones. The vessel (201) of the regenerator comprises in the conventional way at its base a gas distributor (208). The regenerator in its upper part comprises a chimney (202) for recovering the gases. The vessel (201) is also equipped with an inlet (209) via which the coke-containing catalyst can be introduced and an outlet (210) via which the regenerated catalyst can be removed.

Inside the vessel (201) there is a fluidized bed of solid particles comprising a dense fluidized bed (211) and a dilute (or low-density) fluidized bed (212), the latter comprising an internal device (213) positioned above the bed (211).

The regenerator depicted in this example is equipped with a primary cyclone (204) connected to the chimney (202) in order to collect the gases derived from the vessel (201). Any solids that may have been separated by the primary cyclone (204) are returned inside the vessel (201) via a pipe (205) which opens under the internal device (213), in the dense fluidized bed (211).

A secondary cyclone (204'), also outside the vessel (201), collects the gases derived from the primary cyclone (204) via a pipe (206). Any solids that have been separated by the secondary cyclone (204') are returned inside the vessel (201) via a pipe (205') which opens under the internal device (213), in the dilute fluidized bed (212). The gases derived from the secondary cyclone (204') are removed via a pipe (207).

The primary cyclone (204) and the secondary cyclone (204') are thus in series.

The regenerator depicted thus comprises a stage made up of a single primary cyclone and a second stage made up of a single secondary cyclone. As an alternative, each stage could comprise from 2 to 10 cyclones, each secondary cyclone collecting the gases derived from one or more primary cyclone(s).

The remainder of the present description covers illustrative nonlimiting examples of the present invention.

EXAMPLE I

This example compares the change in mass of the particles transported in a fluidized bed according to whether or not it is equipped with internal device. The fluidized bed is contained in a vessel measuring 0.35 m in diameter and 4.5 m in height. Once fluidized, the dense bed has a height slightly in excess of 1 m. Gas surface velocity (Ug) of 0.6 and 0.8 m/s have been considered for the measurements.

The internal device consists of 5 metal plates which crosscross according to the arrangement of FIG. 2B. Plates which are adjacent along the same axis Xi are inclined alternately at 45 and at 135° with respect to the plane of cross section of the internal device, this plane itself being parallel to the plane of the cross section of the regenerator. Of the 5 plates, plates B1, B3 and B5, which are mutually parallel, are inclined at 45°, whereas plates B2 and B4, likewise parallel, are inclined at 135° with respect to the cross section of the internal device and/or the cross section of vessel of the regenerator (FIG. 2). The lengths of these 5 plates are tailored so that the projection of the internal device onto the plane of the free area of the vessel covers almost 100% of this area.

The internal device, of a total thickness of 30 cm, is placed 1.7 m above the gas distributor, namely around 0.7 m above the surface of the dense fluidized bed.

The mass of particles transported by the gas is given in kg/m$^2$ s in Table I below:

TABLE I

| Gas velocity | | Ug = 0.7 m/s | Ug = 0.8 m/s |
|---|---|---|---|
| Mass of particles transported by the gas | Without internal device | 2.3 | 4.2 |
| | With internal internal device | 0.6 | 0.9 |

For the two gas velocities considered, the improvement associated with the use of the internal device is in excess of 70% of efficiency.

EXAMPLE II

This example illustrates how the use of an internal device can make it possible to reduce the total height of a fluidized bed and consequently the total height of the vessel containing the fluidized bed.

The measurements have been taken for a gas surface velocity of 0.8 m/s.

The tests were carried out in the same vessel as the one described in Example I. The tests without internal device were the same as those of Example I: the gas outlet is arranged 4.5 m from the gas distributor, namely around 3.5 meters above the dense fluidized bed. For the tests with the internal device, unlike in Example I, the gas outlet from the vessel was positioned approximately 30 cm above the internal device, namely approximately one meter above the level of the dense fluidized bed, just above the internal device. The results are given in Table II.

TABLE II

| | Gas velocity | Ug = 0.8 m/s |
|---|---|---|
| Mass of particles transported by the gas (kg/m$^2$s) | Without internal device, gas outlet at 3.5 m from the level of the dense bed (at 4.5 m from the bottom of the vessel) | 4.2 |
| | With an internal device of 30 cm thickness, the inferior part of which is situated 1 m above the level of the dense bed, the gas outlet being situated 30 cm above the superior part of the internal device. | 1 |

The example therefore shows how, despite the reduction in the height of the vessel, the internal device makes it possible to considerably reduce the amount of particles transported. Specifically, had the height of the vessel been limited to the TDH, the gas outlet would not be any less than 2.5 m from the level of the dense fluidized bed and the amount of particles transported would not be below 4.2 kg/m$^2$ s. With the internal device, the height can be reduced considerably while at the same time limiting the amount of transported particles to around 1 kg/m$^2$ s.

The invention claimed is:

1. A regenerator for catalytic cracking unit formed of a vessel comprising a first part intended to be occupied by a dense first fluidized bed of solid particles and a second part positioned above the first part and intended to be occupied at least partly by a second fluidized bed of low solid particles density, the second part comprising one internal device covering, by projection onto a plane of a cross section of the vessel, at least 80% of a free cross-sectional area of the vessel of the regenerator, the vessel being equipped with at least one cyclone for separating a mixture of gas and solid particles derived from the second fluidized bed, the cyclone being placed outside the vessel, and the cyclone being designed to collect the mixture of gas and solid particles and comprising a plurality of pipes opening inside the vessel, under the internal device, and without passing through the internal device,
    wherein the cross section of the vessel is a plane perpendicular to an axis of the vessel and perpendicular to a direction in which the mixture of gas and solid particles flows,
    wherein the internal device is made up of one or more individual elements, each individual element being made up of one or more plate stages, each of the plate stages comprising a plurality of plates,
    wherein each of the plurality of plates is inclined parallel to one another within a single plate stage,
    wherein the plurality of plates in the single plate stage are inclined at an opposite direction to the plurality of plates in an immediately adjacent plate stage, and
    wherein the plates of the internal device do not criss-cross.

2. The regenerator according to claim 1, characterized in that the regenerator is further equipped with one, two or three cyclone stages in series, each stage comprising the at least one cyclone, and wherein each stage comprises from 1 to 10 cyclones.

3. The regenerator according to claim 2, characterized in that the regenerator is equipped with two cyclone stages in series, a primary cyclones stage, wherein the at least one cyclone of the primary cyclones stage is designed to collect the gases derived from the vessel of the regenerator, and a secondary cyclones stage, wherein the at least one cyclone of the secondary cyclones stage is designed to collect the gases derived from the primary cyclones stage, and in that the plurality of pipes comprises a first pipe and a second pipe, wherein the first pipe returns the solid particles from the primary cyclones stage to the vessel and opens into the first part of the vessel, and the second pipe returns the solid particles from the secondary cyclones stage to the vessel and opens into the second part of the vessel.

4. The regenerator according to claim 1, characterized in that the internal device is placed above the first fluidized bed at a height h from the surface of the first fluidized bed such that a ratio of the height h to a height of the first fluidized bed $H_1$ varies from 0.05 to 1.5.

5. The regenerator according to claim 1, characterized in that the internal device occupies less than 10% of a free cross-sectional area parallel to the cross section of the vessel of the regenerator and its projection onto a plane of the cross section covers more than 80% of the surface area of the free cross-sectional area.

6. The regenerator according to claim 5, characterized in that the projection of the internal device onto the plane of the cross section covers more than 90% of the surface area of the free cross-sectional area of the vessel.

7. The regenerator according to claim 1, characterized in that a cross section of the internal device, parallel to the plane of the free cross-sectional area of the vessel of the regenerator, occupies at most 5% of the surface area of the free cross-sectional area of the vessel.

8. The regenerator according to claim 1, characterized in that the plates of two adjacent plate stages are separate.

9. The regenerator according to claim 1, characterized in that the internal device has a height of 30 to 50 cm and in that the inclination of each plate with respect to a horizontal plane is from 30 to 60°.

10. The regenerator according to claim 1, characterized in that the inclination of each of the plurality of plates is from 35 to 55°.

11. The regenerator according to claim 10, characterized in that the inclination of each of the plurality of plates is from 40 to 50°.

12. The regenerator according to claim 11, characterized in that the inclination of each of the plurality of plates is 45°.

13. A method of separating a mixture of gas and solid particles derived from a regenerator of a catalytic cracking unit, the regenerator comprising a vessel of which a first part is occupied by a dense first fluidized bed of catalyst particles and a second part, arranged above the first part, is occupied by a second fluidized bed of low catalyst-particle density with respect to the first fluidized bed, in which gases and solids from the second fluidized bed pass through an internal device situated inside the vessel of the regenerator and are then collected at the outlet of the vessel by at least one separation cyclone situated outside the vessel, in which the solid particles recovered by the at least one separation cyclone are returned into the vessel, under the internal device, without passing through the internal device, and in which the internal device covers, by projection onto the plane of the cross section of the vessel of the regenerator, at least 80% of a free cross-sectional area of the vessel of the regenerator, the internal device being made up of one or more individual elements, each individual element being made up of one or more plate stages comprising a plurality of plates which are inclined parallel to one another within a single plate stage, wherein the plurality of plates in the single plate stage are inclined at an opposite direction to the plurality of plates in an immediately adjacent plate stage, and wherein the plates of the internal device do not criss-cross.

* * * * *